United States Patent
Fijas et al.

(10) Patent No.: US 9,453,692 B2
(45) Date of Patent: Sep. 27, 2016

(54) COMPRESSED AIR AFTERCOOLER WITH INTEGRAL MOISTURE SEPARATOR

(75) Inventors: David F. Fijas, Depew, NY (US);
Timothy J. Galus, Hamburg, NY (US)

(73) Assignee: API Heat Transfer Inc., Buffalo, NY (US)

( * ) Notice: Subject to any disclaimer, the term of this patent is extended or adjusted under 35 U.S.C. 154(b) by 797 days.

(21) Appl. No.: 11/722,042

(22) PCT Filed: Dec. 15, 2005

(86) PCT No.: PCT/US2005/045366
§ 371 (c)(1),
(2), (4) Date: Mar. 11, 2008

(87) PCT Pub. No.: WO2006/065963
PCT Pub. Date: Jun. 22, 2006

(65) Prior Publication Data
US 2008/0257532 A1 Oct. 23, 2008

Related U.S. Application Data

(60) Provisional application No. 60/637,055, filed on Dec. 17, 2004.

(51) Int. Cl.
*F25D 17/06* (2006.01)
*F28F 17/00* (2006.01)
(Continued)

(52) U.S. Cl.
CPC ............ *F28F 17/005* (2013.01); *B01D 53/265* (2013.01); *F28D 9/0062* (2013.01); *F28D 2021/0038* (2013.01)

(58) Field of Classification Search
CPC ................ B01D 53/265; F24F 3/1405; F24F 2003/144; F24F 3/1417; F24F 3/1423
USPC ................................................ 62/93–94, 271
See application file for complete search history.

(56) References Cited

U.S. PATENT DOCUMENTS 2,015,490 A     9/1935    McAllister
3,963,466 A *   6/1976    Hynes ......................... 55/434.4
(Continued)

FOREIGN PATENT DOCUMENTS

DE           805049 C     5/1951
DE           3428335 A1   2/1986
(Continued)

OTHER PUBLICATIONS

Machine Translation of abstract, means, and detailed descrition of JP07322901.*

*Primary Examiner* — Melvin Jones
(74) *Attorney, Agent, or Firm* — Phillips Lytle LLP; David L. Principe

(57) ABSTRACT

A system for providing cooled compressed air free of entrained moisture. A housing surrounds a heat exchanger and has an inlet for passage of hot compressed air into an input plenum of the housing and an outlet plenum having an outlet for the cooled and dried compressed air. The bottom of the output plenum extends below the bottom of the heat exchanger to form a trough which collects condensate that collects on the plates of the heat exchanger, flows to the bottom of the heat exchanger, and is pushed by the flow of the compressed air to the output plenum. A shield is placed between the outlet and the heat exchanger to prevent condensate spewed from the plates of the heat exchanger from passing directly across the outlet opening or directly into the outlet opening.

14 Claims, 3 Drawing Sheets

(51) Int. Cl.
  *B01D 53/26*  (2006.01)
  *F28D 9/00*  (2006.01)
  *F28D 21/00*  (2006.01)

(56) References Cited

U.S. PATENT DOCUMENTS

| | | |
|---|---|---|
| 4,080,103 A | 3/1978 | Bird |
| 4,147,923 A | 4/1979 | Davis et al. |
| 4,193,443 A | 3/1980 | Nanaumi et al. |
| 4,237,696 A | 12/1980 | Coblentz |
| 4,249,596 A | 2/1981 | Tutak et al. |
| 4,600,416 A * | 7/1986 | Mann ............... 55/323 |
| 5,428,963 A | 7/1995 | Korycki et al. |
| 5,555,732 A * | 9/1996 | Whiticar ............ 62/3.4 |
| 5,771,707 A * | 6/1998 | Lagace et al. ......... 62/271 |

FOREIGN PATENT DOCUMENTS

| | | |
|---|---|---|
| EP | 1616610 A | 1/2006 |
| FR | 2307237 A | 11/1976 |
| JP | 07322901 | * 12/1995 |
| JP | 2003161251 A | 6/2003 |

* cited by examiner

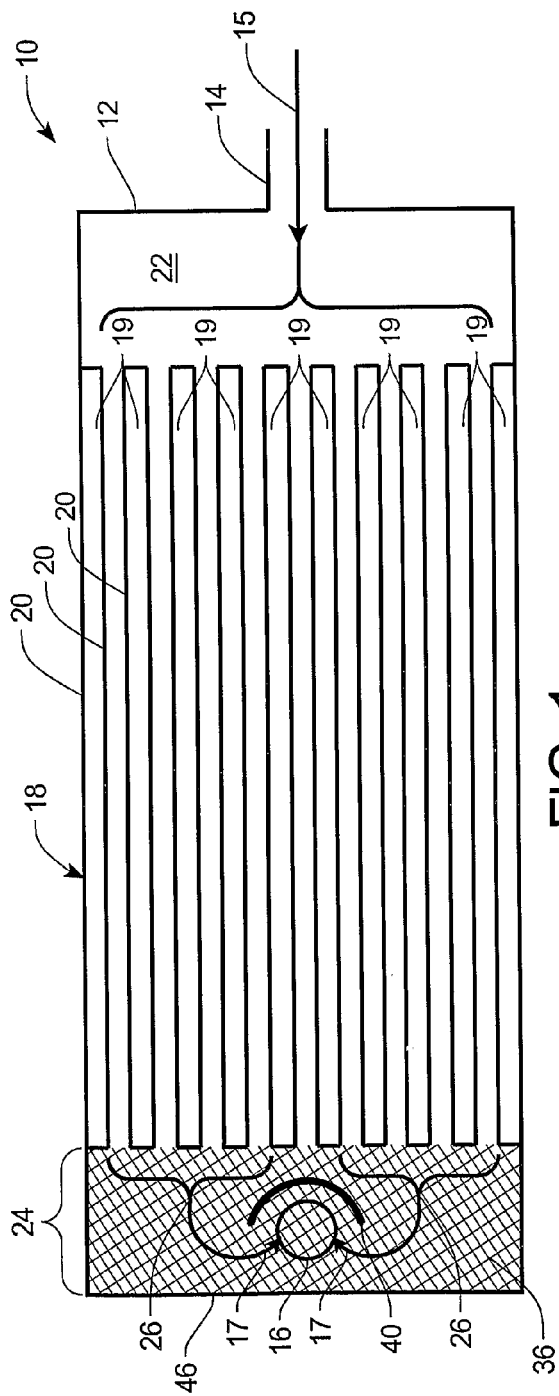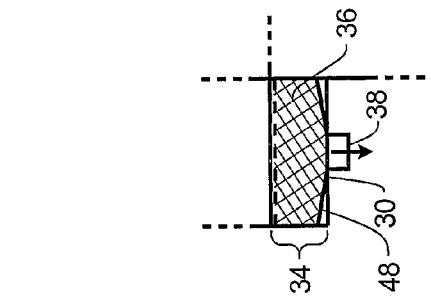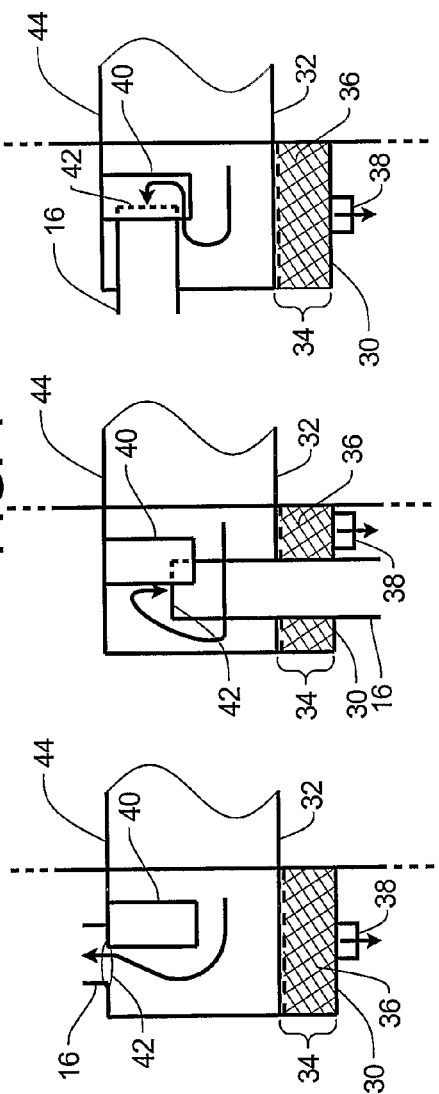

COMPRESSED AIR AFTERCOOLER WITH INTEGRAL MOISTURE SEPARATOR

TECHNICAL FIELD

The present invention relates to the art of heat transfer; more particularly, to heat exchangers for cooling adiabatically compressed air before delivery for use; and most particularly to a compressed air aftercooler including integral passive moisture separation means for removing entrained water from cooled compressed air before delivery for use.

BACKGROUND OF THE INVENTION

Compressed air is widely used in many industrial processes. Typically, air at ambient temperature, pressure, and dew point is adiabatically compressed by known means, such as a motor- or engine-driven piston compressor, to many times atmospheric pressure. In accordance with Boyle's Law, $PV=nRT$, during adiabatic compression the absolute temperature in a compressed air tank of constant volume increases in direct proportion to the increase in absolute pressure.

In many applications, it is desirable to cool the compressed air before it is delivered to a header for use. In the prior art, such cooling is typically accomplished by passing the compressed air through one side of a conventional heat exchanger while passing air at ambient pressure and temperature through the other side. A known problem in the art is that such cooling of compressed air immediately produces condensation of water in the heat exchanger. It is generally undesirable that the condensate be delivered for use with the cooled compressed air; thus in the prior art sumps or active demoisturizing means may be provided for collecting and removing condensate.

What is needed in the art is an improved moisture separation system, preferably passive and preferably formed integrally with an air compression aftercooler.

It is a primary object of the invention to provide cooled compressed air for use substantially free of entrained moisture.

SUMMARY OF THE INVENTION

Briefly described, a system for providing cooled compressed air free of entrained moisture comprises a housing having an inlet for receiving hot compressed air, a heat exchanger, an outlet plenum and an outlet for passing cooled and dried compressed air. At least a portion of a bottom of the output plenum is recessed and lined with a moisture separating material, and the recessed portion has a drain for passing condensate formed in the heat exchanger. In a preferred embodiment a shield is placed between the outlet and the heat exchanger to prevent condensate spewed from the plates of the heat exchanger from passing directly across the outlet opening or directly into the outlet opening.

BRIEF DESCRIPTION OF THE DRAWINGS

The present invention will now be described, by way of example, with reference to the accompanying drawings, in which:

FIG. 1 is a semi-schematic drawing showing a top layout of a compressed air aftercooler and passive moisture-removal improvement in accordance with the invention;

FIG. 2 is a semi-schematic drawing showing a side layout of the compressed air aftercooler of FIG. 1;

FIG. 3 is a semi-schematic drawing showing a side layout of the compressed air aftercooler of FIG. 1 that has been modified;

FIG. 4 is a semi-schematic drawing showing a side layout of the compressed air aftercooler of FIG. 1 with a different modification than shown in FIG. 3;

FIG. 5 is a semi-schematic drawing of an alternate embodiment of the lower portion of FIG. 2;

Figure 6:
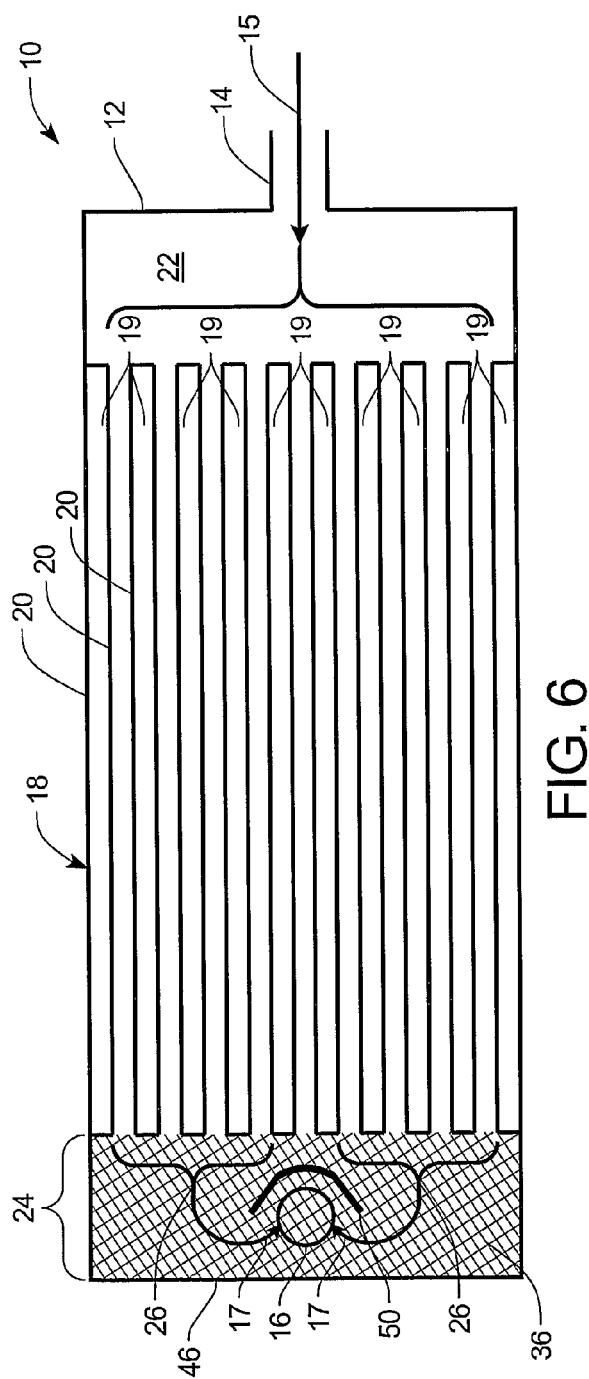
FIG. 6 is a semi-schematic drawing showing the top layout of FIG. 1 with a modified condensate shield.

It will be appreciated that for purposes of clarity and where deemed appropriate, reference numerals have often been repeated in the figures to indicate corresponding features, and that the various elements in the drawings have not necessarily been drawn to scale in order to better show the features of the invention.

DESCRIPTION OF THE PREFERRED EMBODIMENTS

Referring to FIGS. 1 and 2, an improved compressed air aftercooler system 10 for aftercooling and demoisturizing compressed air is shown. By "aftercooling" is meant the removal of the adiabatic heat of compression from compressed air. A housing 12 has an inlet 14 for admitting hot compressed air 15 and an outlet 16 located in the top of the housing 12 for exhausting cooled and demoisturized air 17. Within housing 12 is a heat exchanger 18 known in the art, for example, a conventional bar-and-plate heat exchanger having a plurality of plates 20 for separating a first flow side from a second flow side and for conducting heat therebetween. An intake plenum 22 distributes hot air 15 for flow through the first flow side of heat exchanger 18, and an exhaust plenum 24 collects moisture-laden cooled air 26. Coolant, for example, air at ambient temperature, is passed through the second side of heat exchanger 18 consisting of the vertical channels 19 by conventional pressurizing means (not shown).

The exhaust plenum 24 has a bottom 30 which is lower than the bottom 32 of heat exchanger 18 to form a trough 34. Placed within this trough 34 is moisture separating material 36 preferably made of a high porosity material such as preferably a metallic or plastic mesh. At the bottom of the trough 34 is a water drain 38 for passing the water collected from the hot compressed air 15.

The exhaust plenum 24 also has an arcuate shield 40 positioned between the compressed air entrance 42 of the outlet 16 and the compressed air flowing parallel with the plates 20 which would flow substantially directly across the outlet entrance 42 without the shield 40. The shield 40 extends from the top plate 44 down to approximately the middle of the heat exchanger 18

In operation of system 10, hot moist air 15 as from a compressor enters housing 12 via inlet 14 and is distributed by intake plenum 22 into a first side of heat exchanger 18. The coolant is passed through the channels 19 of heat exchanger 18. Air 15 emerges from heat exchanger 18 as cooled air 26 which is collected in exhaust plenum 24 and exits the aftercooler system 10 through outlet 16. The majority of the moisture which condenses from the compressed air during the cooling process collects on the walls of the plates 20 and flows to the floor 32 of the heat exchanger 18. This condensate as water is pushed by the flow of the compressed air towards and into the exhaust plenum 24 where it flows into the trough 34 and down the drain 38.

While most of the condensate flows to the floor 32 of the heat exchanger 18, some of the condensate remains on the plates 20 and is spewed out from the plates 20 into the exhaust plenum 24. The shield 40 keeps the spewed condensate from directly entering the outlet 16. The spewed condensate hitting the shield 40 either drops directly to the bottom of the trough 30 or is deflected to the inside back wall 46 of the housing 12 where it then drains into the trough 30. The moisture separator 36 essentially prevents the water in the bottom of the trough from being carried by the compressed air through the outlet 16.

FIG. 3 is an alternate embodiment of the invention in which the outlet 16 is located in the bottom of the housing 12.

FIG. 4 is another embodiment of the invention in which the outlet 16 is located in the back wall 46 of the housing 12.

FIG. 5 is a semi-schematic drawing of an alternate embodiment of the lower portion of FIG. 2 in which a slopped bottom 48 has been formed in the trough 30 to better drain the water in the trough 30 into the drain 38.

FIG. 6 is a semi-schematic drawing showing the top layout of FIG. 1 with a modified condensate shield 50 which is curved in the middle and has straight plates attached to the ends of the curve. It will be appreciated that other configurations of the condensate shield can be used such as, for example, a V-shaped shield and a non circular shield.

Figure 7:
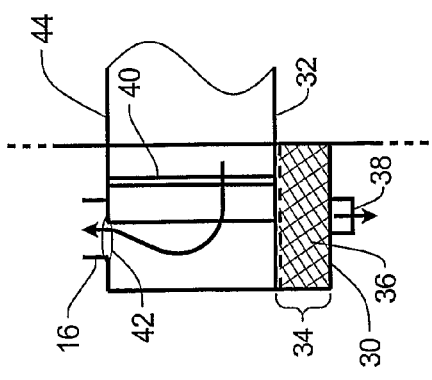
FIG. 7 is a semi-schematic drawing showing a side layout of the compressed air aftercooler of FIG. 6.

FIG. 7 is a semi-schematic drawing showing a side layout of the compressed air aftercooler of FIG. 6 in which the shield 50 extends down to close to the top of the mesh 36. The shield 40 of FIGS. 1-5 could, in the same manner, extend down to the top of the mesh 36 in other embodiments.

Figure 8:
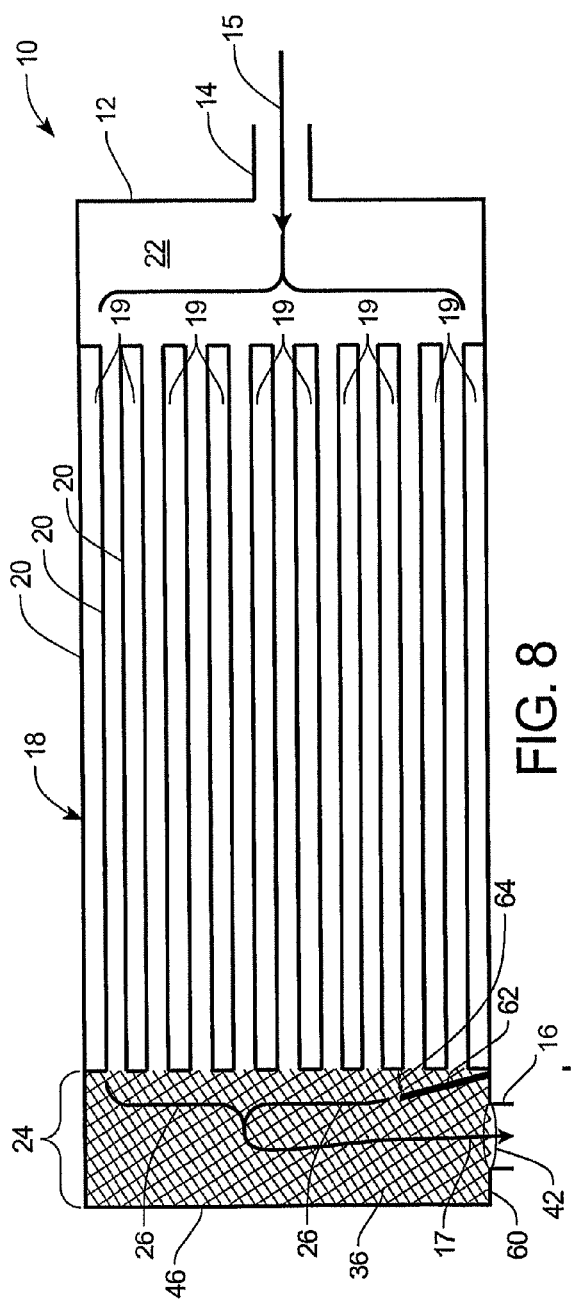
FIG. 8 is a semi-schematic drawing showing a top layout of an alternative embodiment of a compressed air aftercooler and passive moisture-removal improvement in accordance with the invention.

FIG. 8 is a semi-schematic drawing showing a top layout of an alternative embodiment of a compressed air aftercooler and passive moisture-removal improvement in accordance with the invention. In FIG. 8 the outlet 16 is on the narrow side 60 of the exhaust plenum 24. A rectangular shield 62 has one long edge located at the junction of the side 60 and the cooled air outlet end of the heat exchanger 18. The shield 62 is at an angle 64 with respect to the end of the cooled air outlet of the heat exchanger 18. In the preferred configuration of this alternative embodiment the angle 64 is 15°.

Figure 9:
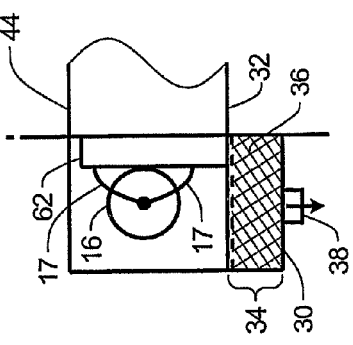
FIG. 9 is a semi-schematic drawing showing a side layout of the compressed air aftercooler of FIG. 8.

FIG. 9 is a semi-schematic drawing showing a side layout of the compressed air aftercooler of FIG. 8. As shown in FIG. 9 the shield 62 extends from close to the top of the mesh 36 to near the top plate 44.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for aftercooling and demoisturizing hot compressed air, comprising:
  a) a housing containing a plate heat exchanger (PHE) for air cooling said hot compressed air during passage therethrough, said PHE having a plurality of horizontally-oriented, substantially parallel plates, said housing having an inlet intaking said hot compressed air, an exhaust plenum portion receiving cooled air having condensed moisture from said PHE, said exhaust plenum portion positioned adjacent and external to said PHE, and an exhaust plenum outlet exhausting said cooled air from said housing;
  b) wherein said PHE has a bottom wall and said exhaust plenum portion has a bottom wall; and
  c) wherein said bottom wall of said exhaust plenum portion is positioned lower than said bottom wall of said PHE, thereby forming a recessed trough collecting said condensed moisture from said cooled air, said recessed trough having a concave inner surface and comprising moisture separating material positioned within said recessed trough, said moisture separating material reducing air flow in said recessed trough and said recessed trough reducing reentrainment into said cooled air of said collected condensed moisture.

2. A system in accordance with claim 1 further comprising a vertically-oriented shield located in said exhaust plenum portion, said shield obstructing said condensed moisture from directly entering said exhaust plenum outlet.

3. A system in accordance with claim 1, further comprising a drain within said recessed trough, wherein said bottom wall of said exhaust plenum portion is canted toward said drain.

4. A system in accordance with claim 2 wherein said shield extends downward from the top of said exhaust plenum portion.

5. A system in accordance with claim 2 wherein said shield extends upward from a region proximate to the top of said moisture separating material.

6. A system for aftercooling and demoisturizing hot compressed air, comprising:
  a) a housing containing a plate heat exchanger (PHE) for air cooling said hot compressed air during passage therethrough, said PHE having a plurality of horizontally-oriented, substantially parallel plates, said housing having an inlet intaking said hot compressed air, an exhaust plenum portion receiving cooled air having condensed moisture from said PHE, said exhaust plenum portion positioned adjacent and external to said PHE, and an exhaust plenum outlet exhausting said cooled air from said housing; and
  b) a vertically-oriented shield located in said exhaust plenum portion, said shield obstructing said condensed moisture from directly entering said exhaust plenum outlet.

7. A system in accordance with claim 1 wherein said moisture separating material is a plastic mesh or a metallic mesh.

8. A system in accordance with claim 1 wherein said bottom wall of said exhaust plenum portion and said bottom wall of said PHE are generally parallel.

9. A system in accordance with claim 1 wherein said exhaust plenum portion has a top wall and said exhaust plenum outlet comprises an opening in said top wall.

10. A system in accordance with claim 2 wherein said shield is arcuate.

11. A system in accordance with claim 6 wherein said shield is arcuate.

12. A system in accordance with claim 6 wherein said exhaust plenum portion has a top wall and said exhaust plenum outlet comprises an opening in said top wall.

13. A method for aftercooling and demoisturizing hot compressed air, comprising:

providing a housing containing (a) an inlet configured and arranged to intake said hot compressed air, (b) a plate heat exchanger (PHE) having a plurality of horizontally-oriented, substantially parallel plates and a bottom wall, (c) an exhaust plenum portion positioned adjacent and external to said PHE such that it receives cooled air having condensed moisture from said PHE, (d) a recessed trough within said exhaust plenum portion, said recessed trough having a bottom wall positioned lower than said PHE bottom wall, and said recessed trough comprising mesh moisture separating material positioned within said recessed trough such that air flow in said recessed trough is reduced, and (e) an exhaust plenum outlet configured and arranged to output said cooled air from said exhaust plenum portion;

receiving said hot compressed air in said PHE through said inlet;

cooling said hot compressed air in said PHE;

receiving cooled air having condensed moisture in said exhaust plenum portion;

collecting condensed moisture in said recessed trough; and outputting cooled air without said collected condensed moisture through said exhaust plenum outlet.

14. The method of claim 13, further comprising:

providing a vertically-oriented shield within said exhaust plenum portion; and obstructing the flow of said condensed moisture from directly entering said exhaust plenum outlet.

\* \* \* \* \*